March 14, 1939.    H. C. HOFFMAN    2,150,222
BRACKET
Filed June 1, 1938    3 Sheets-Sheet 1
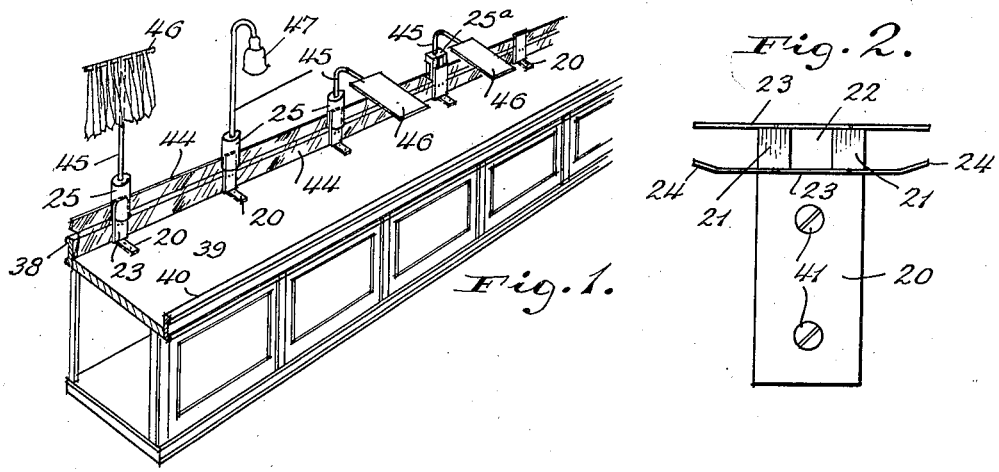
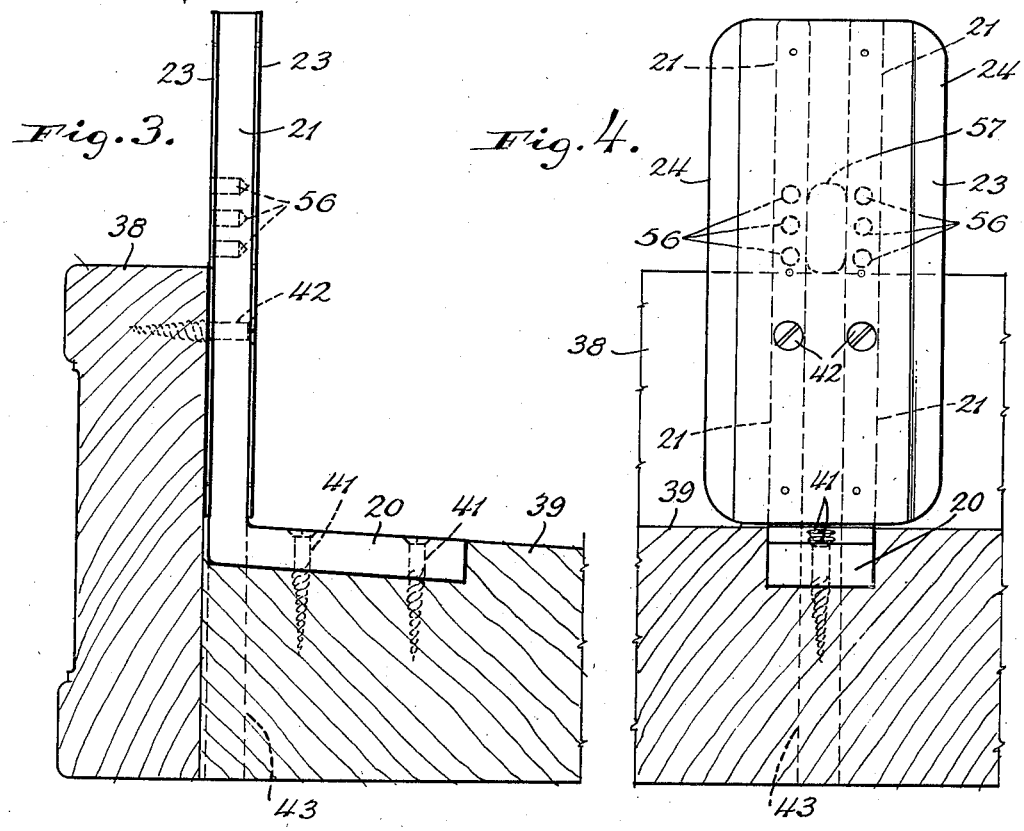
INVENTOR
HENRY C. HOFFMAN
BY
ATTORNEY March 14, 1939.  H. C. HOFFMAN  2,150,222
BRACKET
Filed June 1, 1938  3 Sheets-Sheet 2
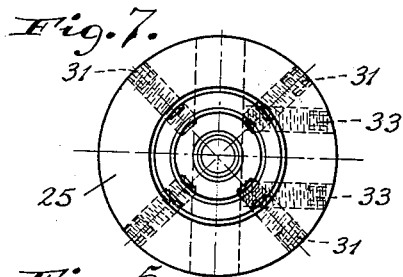
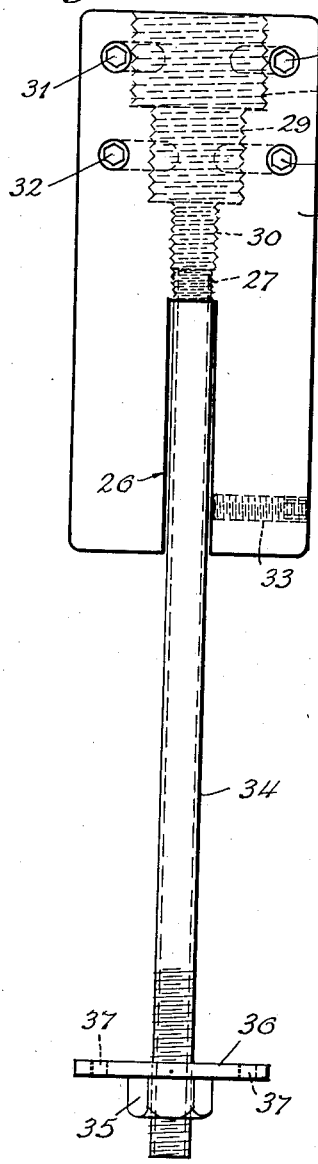
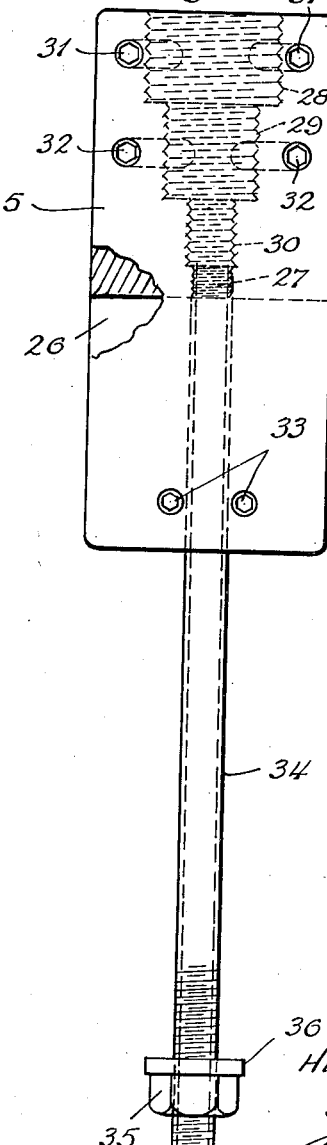
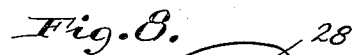
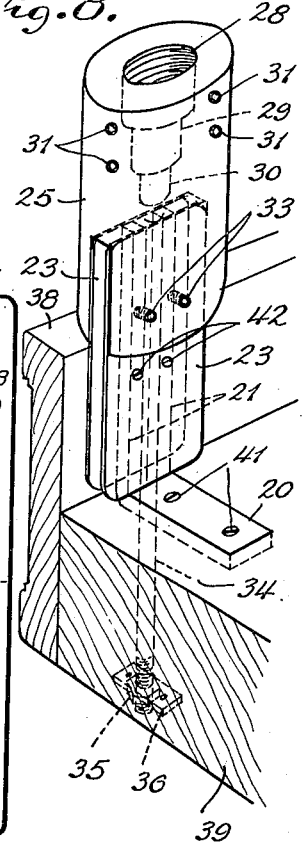
INVENTOR
HENRY C. HOFFMAN
BY
ATTORNEY March 14, 1939. H. C. HOFFMAN 2,150,222
BRACKET
Filed June 1, 1938 3 Sheets-Sheet 3
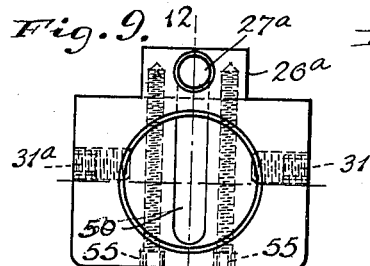
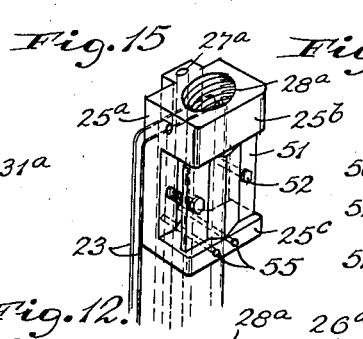
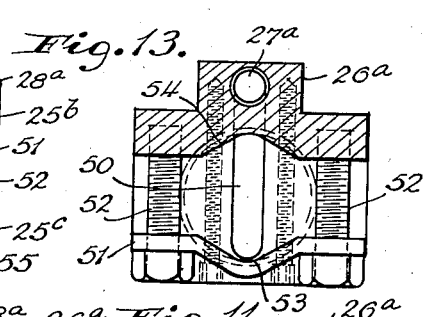
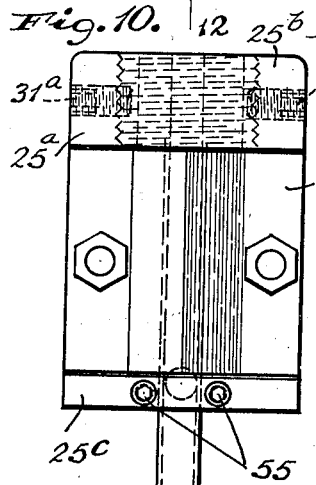
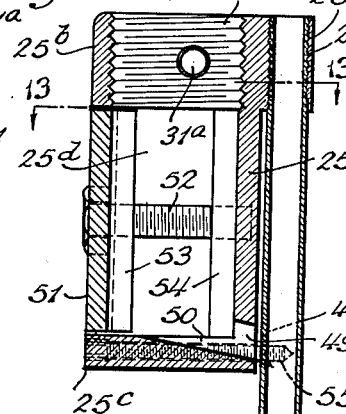
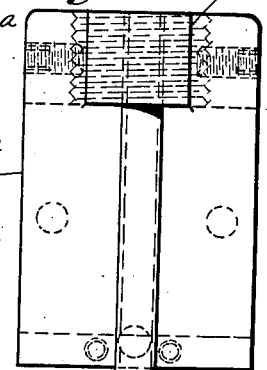
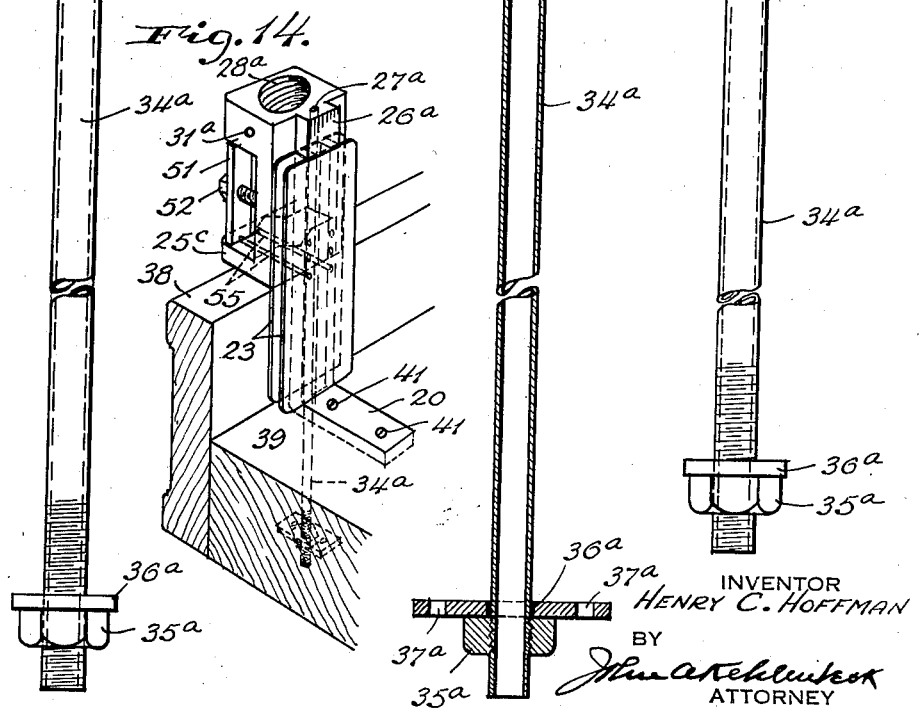
INVENTOR
HENRY C. HOFFMAN
BY
ATTORNEY Patented Mar. 14, 1939

2,150,222

UNITED STATES PATENT OFFICE 2,150,222

BRACKET

Henry C. Hoffman, Forest Hills, N. Y.

Application June 1, 1938, Serial No. 211,133

11 Claims. (Cl. 312—140.4)

The invention relates to brackets and has for its object to provide a bracket of novel construction for supporting display and other fixtures upon the counters of merchandising establishments, in an efficient manner without interference with the freedom of action of the salespeople, and without requiring any special construction in the counters to accommodate the novel brackets. The invention contemplates further a novel bracket which may be attached to the counter in a simple manner without requiring any particular skill in so doing, and which may be selectively located on the counter, and shifted to different positions thereon at will, as occasion may demand. In addition, the invention has for its object to provide a novel bracket with which co-operating types of display and other fixtures may be combined in a manner to enable said fixtures to be readily connected with said bracket and disconnected therefrom, whereby replacements and substiutions may be easily made in a minimum of time. Other more specific objects will appear from the description hereinafter and the features of novelty will be pointed out in the claims.

In the accompanying drawings, which illustrate examples of the invention without defining its limits, Fig. 1 is a perspective view of a merchandise counter with a number of the novel brackets applied thereto; Fig. 2 is a plan view of one section of the bracket; Fig. 3 is a side elevation of said bracket section attached to a counter which is indicated in cross-section; Fig. 4 is a front elevation of said bracket section in operative position on said counter; Figs. 5 and 6 are elevations at right angles to each other of the co-operating section of said bracket; Fig. 7 is a plan view thereof; Fig. 8 is a perspective view showing the complete bracket in place on a counter; Fig. 9 is a plan view of a second form of co-operating section; Figs. 10 and 11 are opposite elevations therof; Fig. 12 is a longitudinal section on the line 12—12 of Fig. 9; Fig. 13 is a horizontal section on the line 13—13 of Fig. 12; Fig. 14 is a perspective view illustrating the bracket with the second form of the co-operating section embodied therein, in place on a counter, and Fig. 15 is a fragmentary perspective showing the two bracket sections combined in an alternative relation.

The novel bracket, in all of its forms, is primarily designed for use with counters having an upright rail at least along the rear edge thereof, and is so illustrated and described; it is to be understood, however, that the selected illustration and description are not intended to arbitrarily restrict the field of usefulness of the novel device.

In the form shown in the drawings, the bracket comprises a main or fixed section consisting of a base plate 20 and upright members 21 projecting upwardly therefrom in spaced parallel relation to form an intermediate channel 22 open at both ends and terminating at its lower end at the bottom face of the base plate 20. The main or fixed section further includes flexible sheet members 23 secured to the upright members 21 in any convenient manner as by spot welding. The arrangement is such that the sheet members 23 span the channel 22 to close the same at the front and back, and project outwardly beyond said upright members 21 in opposite directions to constitute resilient clamping devices for the purpose to be more fully set forth hereinafter; the sheet members 23 preferably are of approximately the same height as the upright members 21 as shown in Figs. 3 and 4, and the outer vertical edges of at least one of said sheet members 23 preferably extend toward the other member 23, as illustrated at 24 in Fig. 2, to increase the clamping action of the clamping devices formed by said members 23.

The novel bracket under discussion further includes a co-operating or auxiliary section which is designed for detachable combination with the main or fixed section in the manner to be more fully described hereinafter.

In the form shown in Figs. 5 to 8 inclusive, the co-operating or auxiliary section consists of a member 25 which may be of any suitable shape and is illustrated as cylindrical in the selected example. The member 25 is constructed of metal or other suitable material and is provided with a slot 26 extending diametrically across said member 25 with its lower end open at the lower face thereof; the slot 26 extends upwardly from said lower face of said member 25 and terminates at an intermediate part thereof, so that, in effect, the lower portion of the member 25 is forked as shown in Figs. 5 and 6. The member 25 further is provided with a socket having its upper end open at the upper face thereof and its lower end in communication with an internally threaded opening 27 in registry and communication with the slot 26 as illustrated in Fig. 5; in the selected example, the socket is divided into three adjacent portions 28, 29 and 30 of progressively decreasing diameters respectively as shown in Figs. 5 and 6, and preferably internally screwthreaded, although this is not absolutely necessary. In the preferred arrangement the member 25 is radially tapped for the accommodation of two groups of set screws 31 and 32 in registry respectively with the portions 28 and 29 of the aforesaid socket, as illustrated in Figs. 5, 6, and 7. The member 25, in addition, carries set screws 33 for instance near its lower end, as shown in Figs. 5 and 8, for the purpose to be more specifically set forth further on in the description.

For the purpose to be more clearly stated hereinafter, the novel bracket includes a bolt 34 which is threaded at one end for screwthreaded connection with the internally threaded opening 27, and at its other end is threaded for the accommodation of a nut 35; in the preferred arrangement, a plate or washer 36 may be provided on said bolt 34 as a bearing surface for the nut 35, said washer 36, if desired, including apertures 37 for the accommodation of nails or screws whereby said plate or washer 36 may be fixed in operative position. For reasons which will appear more fully hereinafter, the bolt 34 may be of tubular construction, the bore of said bolt 34 in such case being capable of use as a conduit through which electric wires or an electric cord may be passed for connecting electric illuminating means or other electrically operated devices carried by the bracket with a source of electricity.

As previously stated herein, the novel bracket is designed primarily for use in combination with counters for displaying merchandise, and more particularly to that type of such counters which include an upright rail 38 at least along the rear edge of the table 39 of said counters; customarily such counters are provided with corresponding upright rails 40 along the front edge of the table 39, the rails 38 and 40 in such case defining a confined space in which the particular merchandise may be contained and displayed on the table 39.

When the novel bracket is in practical use in connection with such a counter, the base plate 20 is secured upon the surface of the table 39 for instance by means of screws 41 or the like, with the base plate 20 preferably countersunk in said table 39 so as to lie substantially flush with the upper surface thereof as shown in Figs. 1, 3, and 8. When the base plate 20 is in place on the counter, the upright members 21 and the flexible sheet members 23 project upwardly therefrom, with the one member 23 in close proximity to and preferably in surface engagement with the upright rail 38 as illustrated in Fig. 3. To increase the rigidity of the clamp on the counter, the main or fixed section thereof may be fastened to said rail 38 by means of screws 42 or the like, which pass through the upright members 21 and the flexible members 23 into the rail 38 for instance as shown in Figs. 3 and 4.

The parts of the main section of the bracket are so dimensioned that the upright members 21 and the flexible sheet members 23 project upwardly beyond the upper edge of the rail 38, for instance as indicated in Figs. 3 and 4; it will be understood that the angle of the base plate 20 relatively to the upright members 21 preferably corresponds to the angle of the upper surface of the table 39 relatively to the inner upright surface of the rail 38, as shown by way of example in Fig. 3.

When the main section of the bracket has been fixed in place on the counter, the latter is drilled in registry with the channel 22 to provide an opening 43 through the table 39 which in effect constitutes a continuation of said channel 22 for the purpose to be clearly set forth hereinafter.

As many main sections as desired may be combined with the counter in the manner indicated, for instance, at spaced intervals along the rail 38, as illustrated in Fig. 1.

At this stage the main sections of the bracket may be used for removably positioning glass or other ornamental panels 44 on the counter in adjacent relation to the rail 38 and so as to project above the same as exemplified in Fig. 1; the panels 44 are held in place by having their opposite ends inserted between cooperating flexible sheet members 23 of opposed bracket sections, whereby said panels 44 are clamped in place and securely, yet removably maintained in upright positions.

If, in addition to maintaining the panels 44 in place on the counter, it is desired to utilize the brackets for supporting display devices for merchandise, the auxiliary section is combined with the main section of the bracket in the manner illustrated in Figs. 1 and 8.

When thus combined, the flexible sheet members 23 and the upright members 21 of the respective main sections extend into the diametric slots 26 of the associated members 25. The latter at this stage accordingly fit over the main sections for instance with the lower ends of said members 25 projecting over and preferably resting upon the upper edge of the upright rear rail 38 of the counter and with the inner end walls of the slots 26 in engagement with the upper ends of the members 21 and the upper edges of the members 23 of each main section. To fix the members 25 in place against unintentional displacement, the screws 33 of each one of said members 23 are screwed into engagement with the associated main section, or specifically with the one flexible sheet member 23 thereof; to avoid distortion of said members 23 by the operative action of the screws 33, the latter are arranged to register with the upright members 21 when the sections of the brackets are combined with each other in the intended manner. The parts preferably are so dimensioned that the outer circumferential surface of the members 25 when mounted on the co-operating main sections will lie substantially flush with the outer upright edges of the flexible sheet members 23, as shown in Fig. 8. In any case the mounting of the auxiliary sections upon the main sections of the brackets will not interfere with the use of the latter for maintaining the panels 44 in operative position as previously described herein; as a matter of fact, the members 25, in addition to their other functions, may serve to prevent unintentional dislocation of said panels 44 as will be clear from an inspection of Fig. 8.

If for any reason it should be desirable to support the auxiliary section or the main section at a higher level than that illustrated in Fig. 8, this may readily be done by means of the screws 33 as will be apparent.

When the auxiliary sections have been properly mounted upon the main sections of the brackets, the internally threaded openings 27 will be located in vertical registry with the channels 22 between the upright members 21 of the main sections; the latter, as previously stated herein, are in registry with the openings 43 in the table 39, which openings 43 are dimensioned to receive the bolts 34. The latter are inserted into the openings 43 and screwed into the openings 27 of the respective members 25, and after the washers 36 have been placed upon the downwardly projecting ends of said bolts 34, the nuts 35 are screwed home thereon to thereby securely fix the members 25 in place upon the main sections of the respective brackets; to prevent any unintentional displacement thereof the washers 36 may be fastened to the lower surface of the table 39 by screws or the like, driven through the apertures 37 into said table 39, it being understood that in some instances these latter operations may be omitted.

After the two sections of each bracket have been combined on the counter, each auxiliary section exemplified by the member 25 and its associated parts will be firmly supported by the co-operating main section of the bracket which is permanently and rigidly fastened on the counter. The display or other fixtures, which generally each include a rod 45, may be mounted on the brackets by screwing the rods 45 into the proper section 28, 29, or 30 of the sockets of the members 25, dependent upon the diameter of said rods 45, after which the screws 31 may be utilized to fasten said rods 45 securely in place on the respective brackets; if the rods 45 are not threaded, said rods may simply be inserted into the proper sections of the sockets of the respective members 25 and secured therein by the screws 31, as will be apparent.

In any case, the rods 45 will be efficiently supported in upright positions by the several brackets at intervals along the rear rail 38 of the counter and in turn will correspondingly support racks or other elements 46, the character of which depends upon the nature of the merchandise to be displayed, as illustrated in Fig. 1.

In some instances, a rod 45 may comprise part of an electric fixture and accordingly serve as a support for an incandescent lamp and its shade 47, and also as a support for other types of electrically operated devices. Under such conditions, the electric wire or cord which supplies current to the lamp or other electric device may pass upwardly through the bolt 34 and the rod 45 which, in such case, is tubular, to the electric bulb or other electric device carried thereby.

The type of auxiliary section of the novel bracket shown in Figs. 9 to 15 inclusive, comprises a member 25ª, which may be of any suitable shape and is shown of generally rectangular form in the selected example. The member 25ª therein includes a head 25ᵇ and a bottom 25ᶜ in vertically spaced relation thereto to provide an intermediate recess 25ᵈ, the head 25ᵇ having a socket 28ª preferably internally screwthreaded and, in any case, extending vertically through said head 25ᵇ as illustrated in Fig. 12. The head 25ᵇ may also be tapped in transverse registry with the socket 28ª for the accommodation of screws 31ª corresponding in function to the screws 31 of the auxiliary section shown in Figs. 5, 6, and 7.

The auxiliary section under discussion further includes a lug 26ª preferably in horizontal registry with the head 25ᵇ and projecting in a direction opposite thereto; as illustrated in Figs. 9, 12 and 13, the lug 26ª is provided with an internally threaded opening 27ª into which the bolt 34ª is screwed for the purpose to be set forth more fully hereinafter. The bolt 34ª is threaded at its lower end for the reception of a nut 35ª and also may carry a washer 36ª similar to the washer 36 and likewise having apertures 37ª corresponding to the apertures 37 of the form first described. As shown in Fig. 12, the bolt 34ª is provided with a preferably elongated slot 48 arranged to register with an opening 49 in the member 25ª, the latter having a continuing channel 50 formed in the bottom 25ᶜ thereof preferably in upwardly inclined communication with the intermediate recess 25ᵈ as illustrated in Fig. 12.

In addition to the parts so far described, the auxiliary section being described includes clamping means consisting for instance of a clamping plate 51 and clamping screws 52 carried by the member 25ª. To increase the efficiency of the clamping means, the plate 51 preferably is recessed as indicated at 53, the member 25ª in such case preferably being provided with an opposed recess 54 as shown in Fig. 13.

In practical operation, the auxiliary section shown in Figs. 9 to 15 inclusive, is arranged for cooperation with the main section of the bracket illustrated in Figs. 2, 3, and 4, to complete the bracket for the purpose of supporting display and other fixtures in the same way as described previously herein.

When the two sections of the bracket are operatively assembled, in the manner shown in Fig. 14, the member 25ª projects over and rests upon the upper edge of the rail 38 to the rear of and contiguous to the rear flexible sheet member 23 thereof; at the same time the lug 26ª extends forwardly over the upper ends and edges of the upright members 21 and sheet members 23 in engagement therewith, with the internally threaded opening 27ª in vertical registry with the channel 22 of the main bracket section. In some installations, as shown in Fig. 15, the member 25ª of the auxiliary section may be positioned in front of the co-operating main section in contiguous relation to the front flexible sheet member 23 thereof; in this arrangement the lug 26ª extends rearwardly over and in engagement with the upper ends and edges of the upright members 21 and sheet members 23, and the threaded opening 27ª in vertical registry with the channel 22 of the associated main section.

In either arrangement of the auxiliary section upon the main section of the bracket, the member 25ª and its associated elements may be fixed in place on the main section by means of the bolt 34ª which is passed up through the opening 43 of the counter and screwed into the opening 27ª of the lug 26ª. When this has been done, the washer 36ª is placed upon the downwardly projecting end of the bolt 34ª and the nut 35ª is screwed home thereon; if desired, the washer 36ª may be fastened in place by driving nails or screws through the apertures 37ª into the counter. It will be understood that the auxiliary section of Figs. 9 to 15 inclusive, may be combined with the main section of Figs. 2, 3, and 4 in such numbers as may be desired at the moment.

After the two sections of each bracket have been combined on the counter, each auxiliary section exemplified by the section 25ª and its associated elements will be firmly and securely clamped upon the co-operating main section of the bracket by the associated bolt 34ª and nut 35ª. The previously mentioned display or other fixtures may be mounted on the brackets by screwing the rods 45 of said fixtures into the socket 28ª and clamping it therein by the screws 31ª; if the rods 45 are not screwthreaded or are smaller in diameter than the sockets 28ª, said rods 45 may simply be inserted through the same into the recesses 25ᵈ and may rest upon the bottoms 25ᶜ of the respective members 25ª. In such case the screws 31ª may be utilized to fit and centre the rods 45 in the sockets 28ª while the clamping plates 51 may be brought into clamping engagement with the rods 45 in the recesses 25ᵈ by the screws 52 to thereby securely fix said rods 45 in place on the brackets.

At this stage the rods 45 and the racks 46 or other devices carried thereby, will be efficiently supported in upright positions by the brackets at intervals along the rear rail 38 of the counter in the same way as shown in Fig. 1.

If a rod 45 supports an incandescent bulb or other electrically operated device, the electric wire or cord which supplies current to the bulb or other device may pass upwardly through the bolt 34ª and out through the slot 48 and opening 49 of the member 25ª along the channel 50 into the recess 25ᵈ; from the latter the wire or cord may pass upwardly through the rod 45, which in such case is tubular, to the electric bulb or other electric device carried by the particular rod 45.

In order to enable each auxiliary section to be elevated relatively to the associated main section, each member 25ª is provided with screws 55 which are arranged to screw into threaded apertures 56 tapped into the main section; as shown in Figs. 3 and 4, the apertures 56 are located in co-operating pairs at progressively higher levels and extend through the one flexible sheet member 23 into the upright members 21 of each main section. Preferably the arrangement is such that the screws 55 may be secured into the lowermost pair of apertures 56 when the bracket sections are combined as shown in Figs. 14 and 15, to thereby increase the rigidity of the brackets as a whole.

If it is desired to raise the position of an auxiliary section on an associated main section, it is simply necessary to loosen the screws 55 and to unscrew the nut 35ª either entirely or sufficiently to enable the member 25ª to be lifted enough to bring the screws 55 into operative relation to the proper apertures 56; the screws 55 may then be screwed into said apertures 56 and the nut 35ª tightened on the bolt 34ª to fix the member 25ª in its relatively raised position on the co-operating main section of the bracket. In order to prevent any electric cord or wires which may pass through the bolt 34ª and rod 45 as previously described herein, from interfering with the aforesaid adjustment of the member 25ª, the rear flexible sheet member 23 of each main section is provided with an elongated slot 57 as shown by dotted lines in Fig. 4.

The novel bracket is capable of combination with the rail 38 of a merchandise counter in any desired numbers and at predetermined points thereof without requiring the rail 38 to be cut or otherwise mutilated in any way. All that is necessary is to drill the table 39 of the counter at the desired points to provide the openings 43 for the accommodation of the bolts 34 or 34ª; when the brackets are not in use at all, or are transferred to some other point of the counter not in registry with a previous drilling, the drilled openings 43 will be inconspicuous, and even entirely hidden by merchandise on the table 39 of the counter.

The novel brackets are simple in construction and economical to produce, and require no particular skill in the attachment with and removal from the rail 38. In addition, the novel brackets are mobile and capable of being readily used in varying relations to each other to provide for a large variety of arrangements which permit the merchandise to be grouped in attractive displays. The novel brackets and the display fixtures when supported thereby do not interfere with the movements of the salespeople or project in any way into the space behind the counters in which the salespeople are required to function. At the same time the merchandise is displayed in positions readily accessible to intending purchasers. As illustrated at the right hand end of Fig. 1, the main sections of the brackets alone are inconspicuous and even ornamental, especially when used simply to fix glass and other panels 44 in place adjacent the rear rail 38 of the merchandise counter.

Various changes in the specific forms shown and described may be made within the scope of the claims without departing from the spirit of the invention.

I claim:

1. The combination of a merchandise counter including a table and an upright rail extending longitudinally thereof, said table being provided with at least one opening extending vertically therethrough at a predetermined point, a main bracket section comprising a base-plate attached to said table and spaced, parallel upright members extending upwardly from said base-plate to form an upright channel in vertical registry with said table opening, flexible sheet members secured to said upright members and projecting transversely beyond the same to constitute resilient clamps, a co-operating bracket section combined with said main section and projecting over said upright rail, said co-operating bracket section having a portion extending over said upright members and provided with a threaded opening in registry with said channel, and being further provided with an upwardly open socket for the reception of a display fixture, means on said co-operating section for securing the display fixture in said socket, and a tubular bolt extending through the table opening and lengthwise of the channel of said main section and screwing into threaded opening for fixing said co-operating section in operative combination with said main section, said tubular bolt constituting a conduit for electric wires or an electric cord.

2. The combination of a merchandise counter including a table and an upright rail extending longitudinally thereof, a main bracket section comprising a base-plate attached to said table and vertical members extending upwardly from said base-plate, flexible members secured to said vertical members and projecting transversely beyond the same to constitute resilient clamps, a co-operating bracket section removably combined with said main section and provided with an upwardly open socket for the reception of display fixtures, means for fastening said auxiliary bracket section on said main section, and means on said co-operating section for securing the display fixture in said socket.

3. The combination of a merchandise counter including a table and an upright rail extending longitudinally thereof, a main bracket section comprising a base-plate attached to said table and vertical members extending upwardly from said base-plate, and flexible members secured to said vertical members and projecting transversely beyond the same to constitute resilient clamps for clamping ornamental panels in position on said counter.

4. A bracket of the kind described comprising a main section consisting of a base-plate, spaced parallel vertical members extending upwardly from said base-plate to form an upright channel terminating at the lower surface of said base-plate, flexible members secured upon opposite sides of said vertical members and projecting transversely beyond the same to constitute resilient clamps, an auxiliary section removably fitted upon said main section and provided with a threaded opening in vertical registry with the upright channel of said main section, said auxiliary section having an upwardly open socket, and a bolt extending lengthwise of said upright channel for screwthreaded connection with said threaded opening.

5. A bracket of the kind described comprising a main section consisting of a base-plate, spaced parallel vertical members extending upwardly from said base-plate to form an upright channel terminating at the lower surface of said base-plate, flexible members secured upon opposite sides of said vertical members and projecting transversely beyond the same to constitute resilient clamps, an auxiliary section provided with an upwardly open socket and slotted to fit over and straddle the vertical members and flexible sheet members of said main section, said auxiliary section having a threaded opening communicating with said socket and arranged to register with said upright channel, and a tubular bolt extending lengthwise of said upright channel for screwthreaded connection with said threaded opening and for communication with said upwardly open socket.

6. A bracket of the kind described comprising a main section consisting of a base-plate, spaced parallel vertical members extending upwardly from said base-plate to form an upright channel terminating at the lower surface of said base-plate, flexible members secured upon opposite sides of said vertical members and projecting transversely beyond the same to constitute resilient clamps, an auxiliary section extending lengthwise of said main section and having a lug projecting over the same, said lug having a threaded opening arranged to register with said upright channel, a head forming part of said auxiliary section and provided with an upwardly open socket, a bottom forming part of said auxiliary section and vertically spaced from said head to form an intermediate recess, a clamping plate in said recess, screws carried by said auxiliary section for operating said clamping plate, and a bolt extending lengthwise of said upright channel for screwthreaded connection with the threaded opening of said lug.

7. A bracket of the kind described comprising a main section consisting of a base-plate, spaced parallel vertical members extending upwardly from said base-plate to form an upright channel terminating at the lower surface of said base-plate, flexible members secured upon opposite sides of said vertical members and projecting transversely beyond the same to constitute resilient clamps, an auxiliary section extending lengthwise of said main section and having a lug projecting over the same, said lug having a threaded opening arranged to register with said upright channel, a head forming part of said auxiliary section and provided with an upwardly open socket, a bottom forming part of said auxiliary section and vertically spaced from said head to form an intermediate recess, said auxiliary section having an opening and a channel in said bottom communicating with said opening and with said intermediate recess, clamping means in said recess, and a tubular bolt extending lengthwise of said upright channel for screwthreaded connection with the threaded opening of said lug, said bolt being provided with a slot arranged to register with the opening and channel of said auxiliary section.

8. A bracket of the kind described comprising a main section consisting of a base-plate, spaced parallel vertical members extending upwardly from said base-plate to form an upright channel terminating at the lower surface of said base-plate, flexible members secured upon opposite sides of said vertical members and projecting transversely beyond the same to constitute resilient clamps, an auxiliary section extending lengthwise of said main section and having an upwardly open socket, a lug forming part of said auxiliary section projecting over said main section and having a threaded opening arranged to register with said upright channel, and a bolt extending lengthwise of the latter for screwthreaded connection with the threaded opening of said lug.

9. A bracket of the kind described comprising a main section consisting of a base-plate and an upright portion extending upwardly therefrom and including oppositely extending resilient clamps, an auxiliary section straddling said upright portion of said main section and provided with an upwardly open socket, and means for removably securing said auxiliary section in combination with said main section.

10. A bracket of the kind described comprising a main section consisting of a base-plate and an upright portion extending upwardly therefrom and including oppositely extending resilient clamps, an auxiliary section provided with an upwardly open socket and extending lengthwise of the upright portion of said main section, a lug forming part of said auxiliary section projecting over the upright portion of said main section, and means for removably securing said auxiliary section in combination with said main section.

11. The combination of a merchandise counter including an upright rail extending lengthwise thereof, a main bracket section consisting of a base-plate secured to said counter and an upright portion extending upwardly from said base-plate in surface contiguity to said rail and upwardly beyond the same, an auxiliary section telescopically fitted upon said upright portion of said main section above said rail and provided with an upwardly open socket, one of said sections including oppositely extending resilient clamps, and means for removably securing said auxiliary section in combination with said main section.

HENRY C. HOFFMAN.